Nov. 26, 1963

W. SARAGA 3,112,463

ACTIVE ELECTRICAL ONE-PORTS

Filed June 18, 1962

United States Patent Office 3,112,463
Patented Nov. 26, 1963

3,112,463
ACTIVE ELECTRICAL ONE-PORTS
Wolja Saraga, Orpington, England, assignor to Associated Electrical Industries Limited, London, England, a British company
Filed June 18, 1962, Ser. No. 203,143
Claims priority, application Great Britain June 20, 1961
6 Claims. (Cl. 333—80)

This invention relates to active electrical one-ports (two terminal impedance networks) which contain active elements (affording negative impedances) in addition to passive elements in the form of resistors (R) and capacitors (C), without inductors (L): such one-ports will be referred to as active RC one-ports or networks.

Active networks are advantageous in that they can be designed to have characteristics which cannot be obtained by passive networks, an example of such a characteristic being a driving point impedance function which is not positive real. Another advantage is that active RC networks can reproduce the characteristics of passive RLC networks, which cannot be done with passive RC networks. The elimination of inductors (L) facilitates miniaturisation, as inductors do not easily lend themselves to this.

Various forms of active RC one-ports are known and it is useful to have available for any specific design problem as many different but equivalent solutions based on different basic forms, as possible. This is because these different solutions usually differ in the number of elements and number of capacitors required, in the actual element values, and in the sensitivity of the circuit performance to variations in the nominal element values and/or to the effect of parasitic elements. The present invention provides a novel form of active RC one-port which is advantageous for the reason just indicated and for which, moreover, the design calculations are particularly suitable for computation by electronic digital computers, which is of practical importance at present and may become of still greater importance in the future.

According to the present invention as basically conceived, an active RC one-part (two-terminal impedance network) comprises a combination of two positive and two negative impedances $kZ_a$, $-kZ_b$, $-k/pZ_b$, and $k/pZ_a$, of which one of the negative impedances and one of the positive impedances are provided in series combination with each other between the two terminals of the network and the other two impedances are also provided in series combination with each other between said terminals, $k$ being an arbitrary but fixed non-zero real number (positive or negative) $Z_a$, $Z_b$, $1/pZ_a$ and $1/pZ_b$ being normalized impedance functions capable of realization by passive RC one-ports, and $p$ being a complex frequency variable defined as $jf/f_{ref}$ where $f$ is the actual frequency and $f_{ref}$ is an arbitrary but fixed reference frequency measured in the same units as $f$.

If $k$ is positive, $kZ_a$ and $k/pZ_a$ are positive RC impedances and $-kZ_b$ and $-k/pZ_b$ are negative (active) RC impedances. If $k$ is negative, $kZ_a$ and $k/pZ_a$ are negative RC impedances and $-kZ_b$ and $-k/pZ_b$ are positive impedances.

Each negative impedance may conveniently be realized by a negative impedance converter terminated by a passive RC one-port of appropriate impedance having regard to the conversion ratio of the converter. Thus for instance positive RC impedances $kZ_b$ and $k/pZ_b$ in conjunction with negative converters having a conversion ratio of $-1$ will give impedances of $-kZ_b$ and $-k/pZ_b$. Various forms of negative impedance converters are known, and such converters having a ratio of $-1$ are described for example in J. G. Linvill's paper "Transistor Negative Impedance Converters" in Proc. I.R.E. 41, June 1953, p. 725.

In carrying out the invention the impedances referred to may be presented by individual RC one-ports. It may sometimes be possible, however, for a single RC one-port to present, with fewer components, an impedance corresponding to the resultant of one of the negative impedances taken with one of the positive impedances. If this resultant is itself a positive impedance only one negative impedance one-port will then be required in the overall network, requiring only a single negative impedance converter where such is used. This will be explained more fully later.

In further considering the invention and the theoretical considerations on which it is based, reference will be made to the accompanying drawings in which:

FIGS. 4a and 4b show simplified versions of FIG. 4; and

Figure 1:
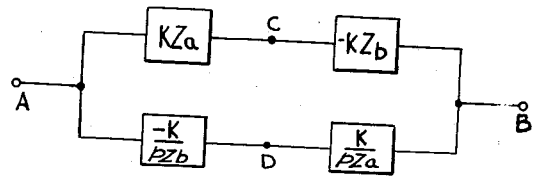
FIG. 1 represents in schematic block form a basic form of active RC one-port according to the invention.

Referring to FIG. 1, an active RC one-port conforming to the invention basically comprises, between its two terminals A and B, impedances $kZ_a$, $-kZ_b$, $-k/pZ_b$ and $k/pZ_a$ which have been represented in FIG. 1 as being presented by individual RC one-ports shown as separate rectangles. Two of these impedances $kZ_a$ and $-kZ_b$, one of which is positive and the other negative according to the sign of $k$, are in series with each other between terminals A and B, as are also the other two impedances.

Figure 2:
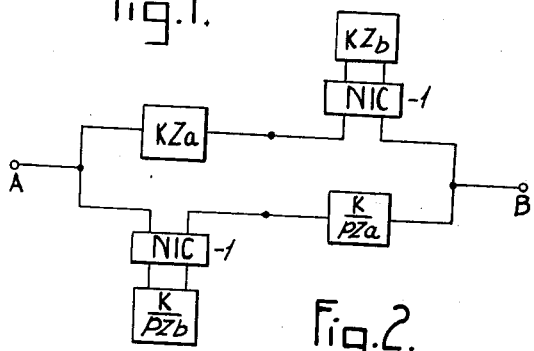
FIGS. 2 and 3 represent in schematic block form ways of realizing the active one-port of FIG. 1 using negative impedance converters for obtaining negative impedance functions.
Figure 3:
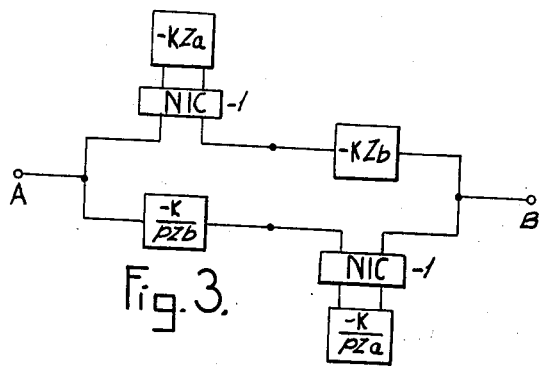

The negative impedances can be realized by means of negative impedance converters as previously mentioned. This is represented in FIGS. 2 and 3 which are both equivalents of FIG. 1. As $Z_a$, $Z_b$, $1/pZ_a$, $1/pZ_b$, are normalized impedance functions capable of realization by passive RC one-ports, FIG. 2 is the equivalent which would be used for positive $k$, and FIG. 3 is the equivalent which would be used for negative $k$, the rectangles NIC representing in each case negative impedance converters of ratio $-1$.

It can be seen by inspection of FIG. 1 that the normalized impedance $Z(p)$ presented by the network across terminals A and B is given by the expression:

$$Z_{AB}(p) = \frac{k(Z_a - Z_b)}{1 - pZ_a Z_b}$$

and it can be proved mathematically that, for any positive or negative value of $k$, passive RC impedances $Z_a$ and $Z_b$ can be found to satisfy this expression for any given real rational function $Z_{AB}(p)$. Furthermore if $Z_a$ and $Z_b$ can be realized by passive RC networks, so also can $1/pZ_a$ and $1/pZ_b$. Hence any real rational impedance function $Z(p)$ can be realized as an active RC network of the general form represented by FIG. 1.

The impedance functions $Z_a$ and $Z_b$ needed to give a required impedance function $Z(p)$ can be determined from the expressions:

$$Z_a = -\frac{(Q_a)_o}{q(Q_a)_e} \text{ and } Z_b = \frac{(Q_b)_o}{q(Q_b)_e}$$

where $q = p^{1/2}$, $(Q_a)_e$ and $(Q_a)_o$ are the even and odd part respectively of $Q_a$, $(Q_b)_e$ and $(Q_b)_o$ are likewise the even and odd part of $Q_b$, and $Q_a$ and $Q_b$ are polynomials in $q$ defined by $$Q_a = \prod_a (q-q_a) \text{ and } Q_b = \prod_b (q-q_b)$$

where $\prod$ is a symbol denoting a product extended over all values of the subscript ($a$ or $b$), $q_a$ and $q_b$ being the one-points of $qZ/k$ (that is, the points in the $q$-plane at which $qZ/k$ is equal to $+1$) in the right half and left half respectively of the $q$-plane, and where in those cases in which $qZ/k$, considered as a function of $q$, has a common factor $q$ in its numerator and denominator, either the expression given above for $Q_a$ or that given for $Q_b$ is multiplied by $q$. As an alternative to this multiplication, the same result can be achieved as explained below by the introduction of the concept of an "apparent one-point" at $q=0$, which is not an actual one-point of $qZ/k$. An example of this latter procedure is to be seen in Example 3 given later.

The procedure for determining $Z_a$ and $Z_b$ can then be as follows: decide on a value for $k$ and multiply the wanted impedance function by $q/k$ to get $qZ/k$ and find the one-points of $qZ/k$, any common factor $q$ in the numerator and denominator not being cancelled. If there is no such common factor and if $qZ/k$ is written in the form $N(q)/D(q)$ where N and D are polynomials in $q$, then the one-points of $qZ/k$ are identical with the zero-points of $[N(q)-D(q)]$. If a common factor $q$ does occur in $N(q)$ and $D(q)$ and is not cancelled, then $[N(q)-D(q)]$ has a zero at $q=0$ which is not a one-point of $qZ/k$, but will be designated as an "apparent one-point." Separate the one-points lying in the right-hand half of the $q$-plane (denoted by $Q_a$) from those lying in the left-hand half (denoted by $Q_b$). If an apparent one-point $q=0$ occurs this point can be associated with either the $q_a$ or the $q_b$. Form the polynomials $$Q_a = \prod_a (q-q_a) \text{ and } Q_b = \prod_b (q-q_b)$$

and separate them into their even parts $(Q_a)_e$, $(Q_b)_e$ and odd parts $(Q_a)_o$, $(Q_b)_o$ in accordance with $$Q_a = (Q_a)_e + (Q_a)_o \text{ and } Q_b = (Q_b)_e + (Q_b)_o$$

Thence derive $Z_a$ and $Z_b$ from the expressions given.

Having calculated $Z_a$ and $Z_b$ (which it will be recalled are normalized impedances) the values of the RC components necessary to realize them, and also $1/pZ_a$ and $1/pZ_b$, can be found by well known methods. The factor $k$ can be chosen so as to simplify the numerical work involved in finding $Z_a$ and $Z_b$, to minimize the number of components or the number of capacitors required in the final network, or to minimize the sensitivity of the circuit performance to variations of element values in the passive or active parts of the network. $k$ is not merely a scale factor, because the one-points of $qZ/k$ vary in a complicated way with $k$, so that $Z_a$ and $Z_b$, which depend on the one-points, will do so also.

It is worth noting that in many cases it is possible to recognize $Q_a$ and $Q_b$ directly by inspection of the equation $qZ(p)=1$. This is indicated in Example 2.

The following calculations for the synthesis of active RC one-ports in accordance with the invention are given by way of example.

*Example 1*

Let a network be required having a normalized driving point impedance $Z_{AB}(p)=p(=q^2)$. Take $k=1$.
One therefore gets:

$$qZ/k = q^3; \quad q_a = 1; \quad q_b = -\frac{1}{2} \pm j\frac{\sqrt{3}}{2}$$

From which, using the procedure given above:

$$Z_a = 1, \quad Z_b = \frac{1}{1+p}, \quad \frac{1}{pZ_a} = \frac{1}{p} \text{ and } \frac{1}{pZ_b} = 1 + \frac{1}{p}$$

Figure 4:
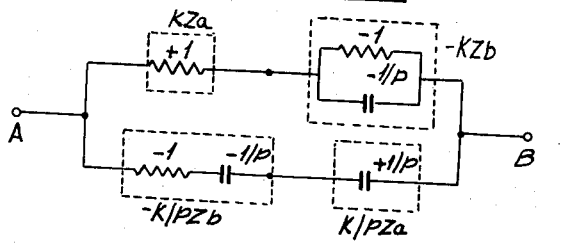
FIGS. 4 and 5 show the networks resulting from specific design examples given later.

The resultant RC network is therefore that shown in FIG. 4, using the usual symbols for resistive and capacitive impedances. It will be noted that in the impedances $$-k/pZ_b = -1 - \frac{1}{p} \text{ and } k/pZ_a = +\frac{1}{p}$$

the terms $-1/p$ and $+1/p$ are equal and opposite so that their resultant as connected in series is zero and the network can be simplified to that shown in FIG. 4a. Another simplification, on a different basis, is given in FIG. 4b and will be considered later.

*Example 2*

Let the required impedance function be $$Z(p) = 1/(2+2p+p^2)$$

which it will be noted is not a positive real function. Again taking $k=1$, one gets $qZ/k = q/(2+2q^2+q^4)$ at the one-points of which $q^4+2q^2-q+2=0$. The one-points are $q_b = (-1 \pm \sqrt{7})/2$ and $$q_a = \frac{1 \pm j\sqrt{3}}{2}$$

whence $$Z_a = \frac{1}{1+p}, \quad Z_b = \frac{1}{2+p}, \quad \frac{1}{pZ_a} = 1 + \frac{1}{p} \text{ and } \frac{1}{pZ_b} = 1 + \frac{2}{p}$$

(This example could have been worked without actually determining the one-points, because $$q^4+2q^2-q+2=0$$

can be rewritten $(q^2+q+2)(q^2-q+1)=0$, giving $Q_a = q^2-q+1$ and $Q_b = q^2+q+2$ directly.)

*Example 3*

Let the required impedance function $Z_{AB}(p)$ be $$\frac{8p}{15} + \frac{7}{15p}$$

(corresponding to the impedance of a passave LC series network) and again take $k=1$.

$$qZ/k = \frac{8q^3}{15} + \frac{7q}{15q^2}$$

(NOTE: Do not cancel $q$).

$$q_a = 0, +1, +\frac{1}{2}$$

$$q_b = -\frac{3}{4} \pm j\frac{\sqrt{19}}{4}$$

(Note that $q_a = 0$ is an apparent one-point)

$$Z_a = \frac{2}{3} + \frac{1}{3p}, \quad Z_b = \frac{1}{7/6 + \frac{2p}{3}}, \quad 1/pZ_a = \frac{1}{\frac{1}{3} + \frac{2p}{3}}, \quad 1/pZ_b = \frac{2}{3} + \frac{7}{6p}$$

Figure 5:
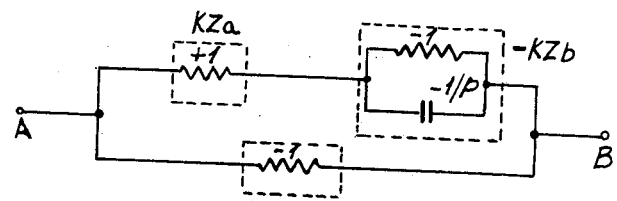
Figure 5:
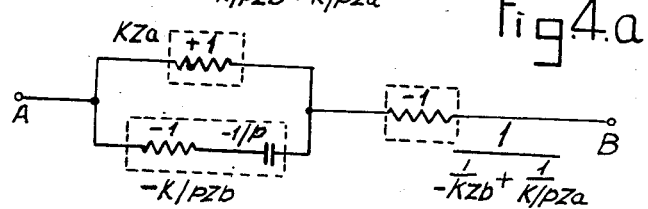
Figure 5:
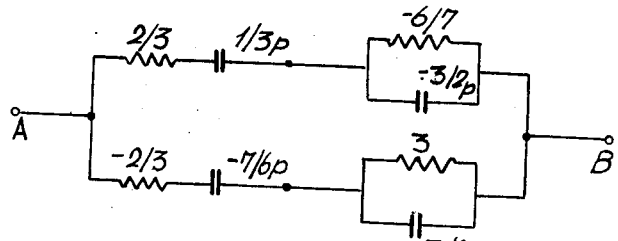

This can be realized by the network shown in FIG. 5, which it will be noted contains no inductance, although the impedance characteristic is that of a passive LC network.

*Example 4*

Let the required $Z_{AB}(p)$ be $$\frac{8p}{15} + \frac{7}{15p}$$

(the same as in Example 3), but this time take $$k = \frac{15}{8}$$

Hence:

$$q_a = 0, \frac{1}{4}, 1.4264 \quad q_b = -0.838 \pm j1.323$$

$$kZ_a = 1.1185 + \frac{1}{2.5072p}, \quad kZ_b = \frac{1}{0.7805 + 0.3181p}$$

(Here again $q_a = 0$ is an apparent one-point)

Note that in this case, although the network takes the same form as for Example 3, $Zk_a$ and $Zk_b$ are not $k$ times $Z_a$ and $Z_b$ as derived in that example: in other words $k$ is not merely a scaling factor.

Returning to FIG. 1 it is possible, in accordance with the invention, for the points C and D to be used as the one-port terminal pair of the network instead of AB, in which case the impedance function $Z_{CD}(p)$ presented by the network across terminals CD is given by $$Z_{CD}(p) = k\frac{1 - pZ_aZ_b}{p(Z_a - Z_b)}$$

which will be seen to be $k^2/pZ_{AB}$.

With the impedances connected between the terminals in the order shown in FIG. 1, namely with one positive impedance and one negative impedance connected to each terminal, the points CD are conjugate to terminals AB so that the impedance $Z_{AB}$ presented by the network between terminals AB will be unaffected by any external impedance connected between points CD, and likewise the impedance $Z_{CD}$ presented by the network across terminals connected to points CD will be unaffected by any impedance between terminals AB. Therefore the network may be used to provide two impedances $Z_{AB}$ and $Z_{CD} = k^2/pZ_{AB}$ simultaneously without mutual interference.

Figure 6:
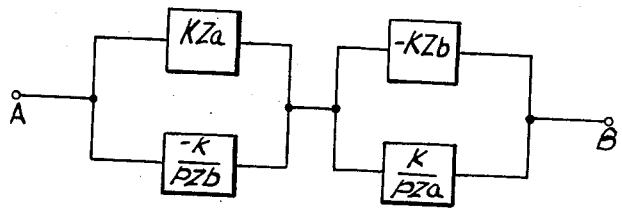
FIG. 6 represents in block form a modified version of FIG. 1.

For the same reason it is possible to short circuit the points CD in FIG. 1 (so that in effect they become a single, common, point) without affecting the impedance $Z_{AB}$. If this is done the network can be represented in the form given in FIG. 6. It may then be possible, dependent on the determined impedance functions $Z_a$, $Z_b$, $1/kZ_a$ and $1/kZ_b$, for one or each of the two pairs of parallel connected impedances (namely $kZ_a$ with $-k/pZ_b$ and $-kZ_b$ with $k/pZ_a$) to be replaced by an equivalent RC one-port giving the same resultant impedance. For example the network of FIG. 4 could be simplified on this basis to the form shown in FIG. 4b in that the parallel combination of capacitors $+1/p$ and $-1/p$ in $k/pZ_a$ and $-kZ_b$ corresponds to an infinite impedance (open circuit) across the $-1$ resistor in $-kZ_b$. It is to be be understood, however, that the possibilities of parallel or series combination of certain of the determined impedance functions in a one-port giving only the resultant impedance of such combination and not the individual functions separately, are quite general and are not restricted simply to the omission of mutually cancelling impedance elements as in the simple examples given with reference to FIGS. 4a and 4b.

If in any of the circuits shown each constituent impedance function is multipled by $-1$, then also the total impedance $Z_{AB}$ and $Z_{CD}$ will be replaced by its negatives, as will also be $Z_{CD}$ where the points CD are not short circuited.

What I claim is:

1. An active two-terminal RC impedance network comprising a combination of two positive and two negative impedances $kZ_a$, $-kZ_b$, $-k/pZ_b$, and $k/pZ_a$, of which one of the negative impedances and one of the positive impedances are provided in series combination with each other between the two terminals of the network and the other two impedances are also provided in series combination with each other between said terminals, $k$ being an arbitrary but fixed non-zero real number (positive or negative), $Z_a$, $Z_b$, $1/pZ_a$ and $1/pZ_b$ being normalized impedance functions capable of realization by passive RC one-ports, and $p$ being a complex frequency variable defined as $jf/f_{ref}$ where $f$ is the actual frequency and $f_{ref}$ is an arbitrary but fixed reference frequency measured in the same units as $f$.

2. An active two-terminal network as claimed in claim 1 including for the realization of a negative impedance a negative impedance converter terminated by a passive RC one-port of appropriate impedance having regard to the conversion ratio of the converter.

3. An active two-terminal network as claimed in claim 1 wherein one of the positive impedances and one of the negative impedances are provided in parallel combination with each other between one of the terminals of the network and a common point between which and the other terminal are provided the other two impedances also in parallel combination with each other.

4. An active two-terminal network as claimed in claim 1 wherein one of the positive impedances and one of the negative impedances are connected between one of the terminals of the network and respective points between which and the other terminal are connected the other positive impedance and the other negative impedance respectively, the network presenting between its two terminals on the one hand and said points on the other hand respective, mutually non-interfering one-port impedances.

5. An active two-terminal network as claimed in claim 1 including in substitution for one of the positive impedances and one of the negative impedances a single RC one-port presenting an impedanoce which corresponds to the resultant of these two impedances.

6. An active two-terminal network as claimed in claim 3 including in substitution for one of the positive impedances and one of the negative impedances a single RC one-port presenting an impedance which corresponds to the resultant of these two impedances.

No references cited.